Dec. 6, 1955   L. MAKOUS   2,725,850
MILK PUMP ASSEMBLY
Filed May 19, 1952   3 Sheets-Sheet 1

INVENTOR.
Lawrence Makous
BY Andrus & Sceales
ATTORNEYS.

Dec. 6, 1955

L. MAKOUS 2,725,850

MILK PUMP ASSEMBLY

Filed May 19, 1952

INVENTOR.
Lawrence Makous.
BY Andrus & Sceales
ATTORNEYS.

United States Patent Office 2,725,850
Patented Dec. 6, 1955

2,725,850

MILK PUMP ASSEMBLY

Lawrence Makous, Milwaukee, Wis., assignor to A. O. Smith Corporation, Milwaukee, Wis., a corporation of New York Application May 19, 1952, Serial No. 288,592

6 Claims. (Cl. 119—14.07)

This invention relates generally to cow milking systems and particularly to a milk releaser assembly therefor.

In the conventional milking system, wherein a milk releaser is employed, the cows are generally milked with vacuum operated teat cups from whence the milk goes directly from the cups to a pipe line. The pipe line carries the milk to a container where the milk is collected for a predetermined time interval. This container is generally known as a milk releaser, because of the fact that after the milk has been collected therein for the given time interval it is then released to a second pipe line which carries it to a bulk receiver, such as for instance a milk cooler. The conventional milk releasers comprised a receiving chamber and a discharge chamber with a valve member disposed therebetween which generally operated solely from the weight of the milk. The quantity of milk passing from the discharge chamber of the milk releaser into the supply line of the bulk receiver depended to a great extent on atmospheric pressure, and this necessitated a substantial time element in permitting atmospheric pressure to be attained after a condition of vacuum had existed. One way of alleviating this undesirable loss of time was to force the milk from the releaser by air pressure but this method subjected the milk to possible contamination from contact with the air or produced a frothing condition which interfered with the subsequent straining of the milk.

An object of the present invention is to provide a milk releaser which will release or discharge milk at an increased flow rate due to the creation of pressure differentials between the chambers therein.

Another object is to provide a milk releaser which discharges the milk with a positive pressure and is capable of lifting the discharged milk to any practical height to facilitate piping of the same.

A further object of the invention is to provide a milk releaser in which a positive air pressure is employed to force the milk from the discharge chamber of the releaser unit to a bulk storage tank without contaminating the milk.

Another object is to provide a milk releaser of the type just mentioned in which the air is prohibited from coming into contact with the milk.

Still another object is to provide a milk releaser comprising a releaser chamber having a flexible liner therein which, because of a positive air pressure being applied thereto, forces the milk from the release chamber without the air contacting the milk, and because of the disposition of the liner with respect to the vacuum pipe, prohibits milk and foam from entering the pipe to contaminate the same.

Another object is to provide a milk releaser which may be positively operated electrically to deliver a certain predetermined quantity of milk during a cycle of operation.

Another object is to provide a milk releaser which may be operated electrically to deliver a positive pressure to discharge milk from the releaser unit.

Another object is to provide a milk releaser of relatively few parts and which is therefore inexpensive to make.

Another object is to provide a milk releaser assembly which may be disassembled readily for cleaning purposes.

These and other objects will appear from the following description of a preferred embodiment of the invention when taken in conjunction with the drawings, in which.

Figure 1:
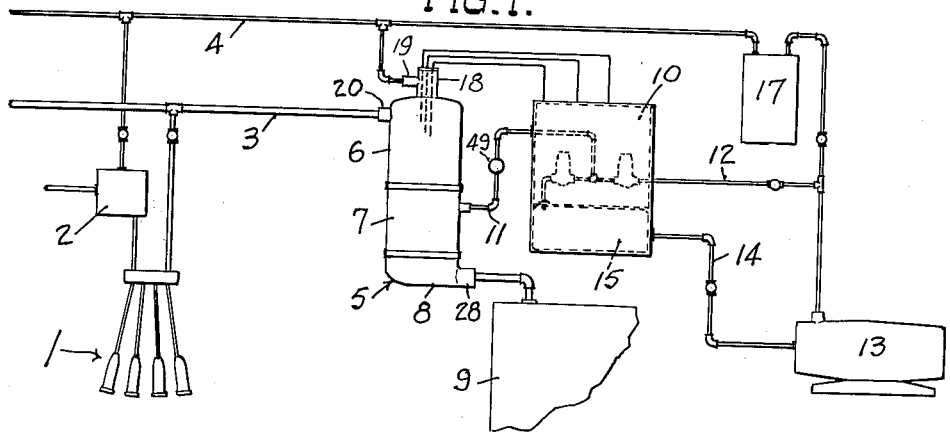
Figure 1 is a schematic drawing of a milking system embodying the milk releaser of the invention.

With reference to Figure 1, which shows schematically a continuous milk system embodying the milk releaser of the invention, there is illustrated a plurality of vacuum operated teat cups 1 having a suitable pulsator 2 to operate the same. Milk from cups 1 is supplied to line 3 in response to vacuum shown schematically as coming from line 4. The milk from line 3 is carried to a releaser container 5, which will be more fully described hereafter, but which for the purpose of a general description of the system here stated, comprises a chamber 6 for receiving the milk from line 3, a releaser chamber 7 disposed in subjacent alignment with chamber 6, and a discharge tube 8 connected to the releaser chamber and adapted to carry milk to a bulk supply receiver 9, such as for instance a milk cooler.

Figure 2:
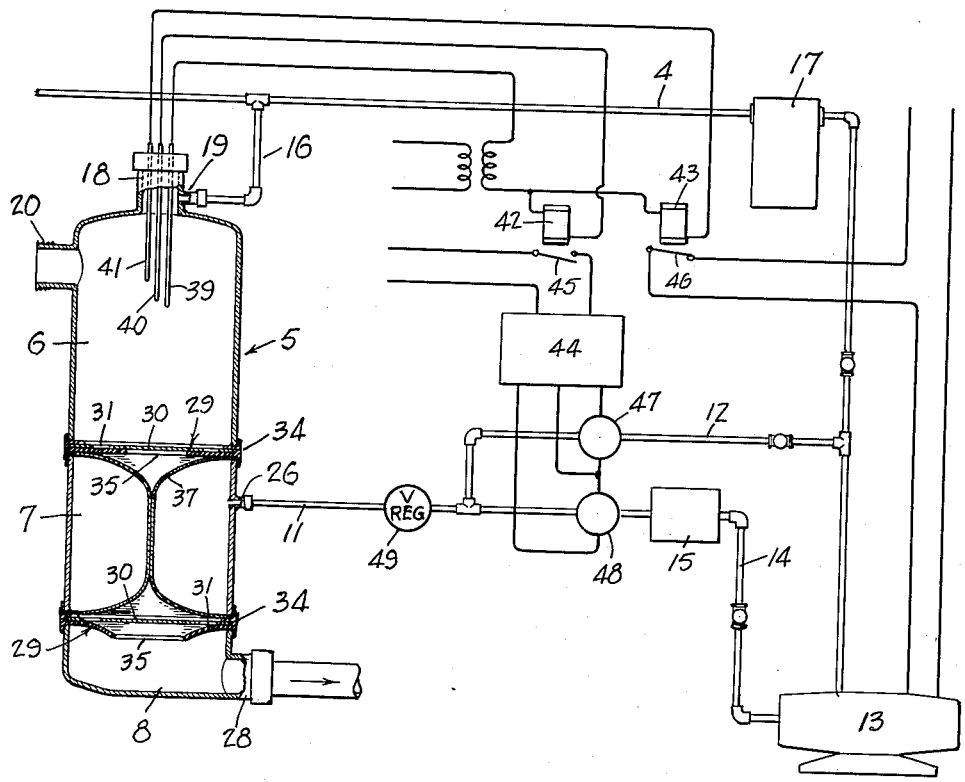
Fig. 2 is a partial schematic and partial diagrammatic view of the electrical pumping system showing the milk discharge unit.

A cabinet 10, for housing suitable electrical mechanism employed to operate the milk releaser 5, is disposed adjacent the latter, and is connected to the releaser chamber 7 through a suitable line 11 adapted to alternately pull a vacuum on, or supply air pressure to chamber 7. A vacuum line 12 extends between the control cabinet 10 and the vacuum side of a pump 13 while pressure line 14 extends between the exhaust side of pump 13, a pressure tank 15, and between the pressure tank and the control cabinet 10. As will be more fully explained hereinafter, especially with reference to Fig. 2, the cabinet 10 is adapted to contain suitable relays, solenoid valves and a timer mechanism which function to alternately pull a vacuum on or to apply pressure to a flexible liner in chamber 7 to positively discharge or squeeze milk from the releaser chamber in accordance with a predetermined cycle. The cycle timer is activated by the closing of an electrical circuit between a plurality of electrodes extending downwardly through the top of the receiving chamber 6, the circuit being completed when the milk in the chamber rises to a predetermined horizontal plane between certain of the electrodes. The receiving chamber 6 is connected into the main vacuum line 4 by line 16 extending therebetween. A suitable vacuum tank 17 is disposed in line 4 for the usual purpose.

Figure 3:
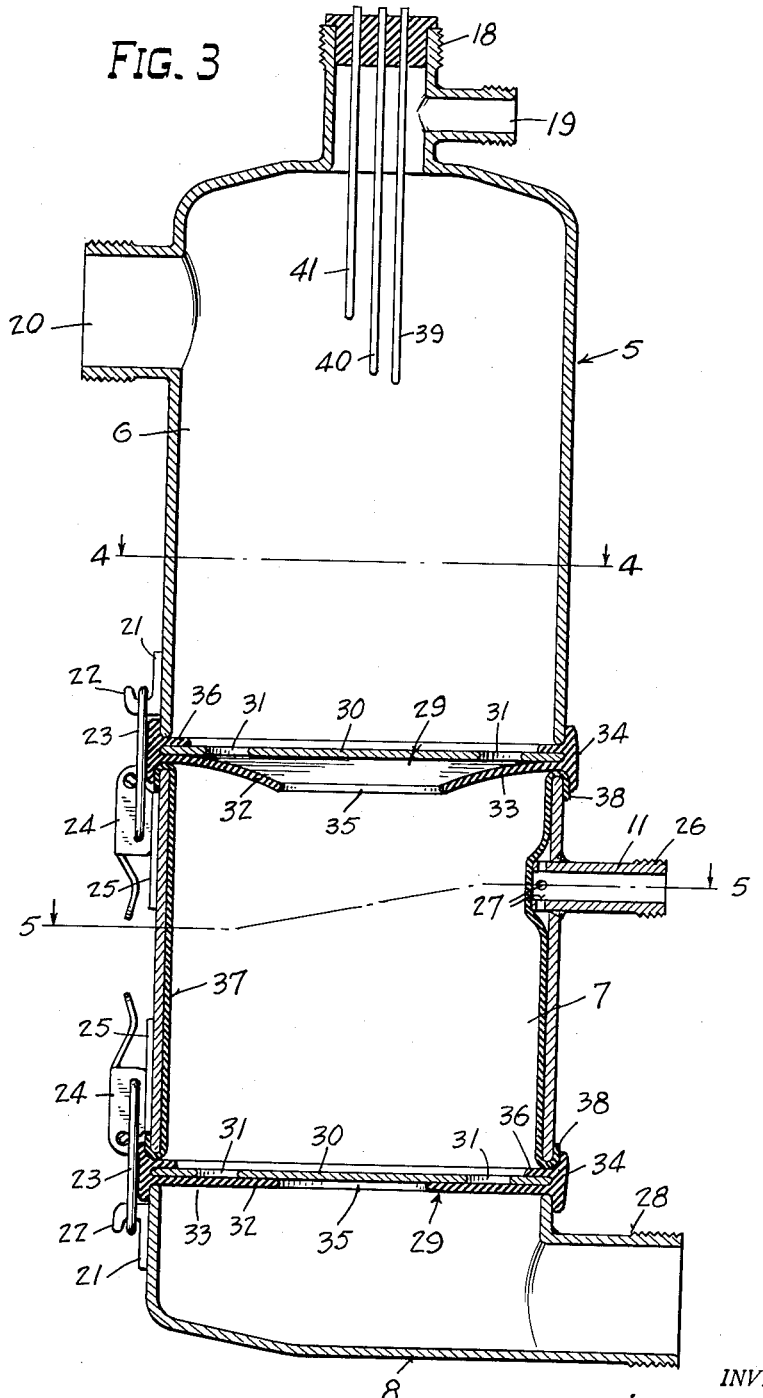
Fig. 3 is a medial vertical sectional view through the milk releaser.
Figure 4:
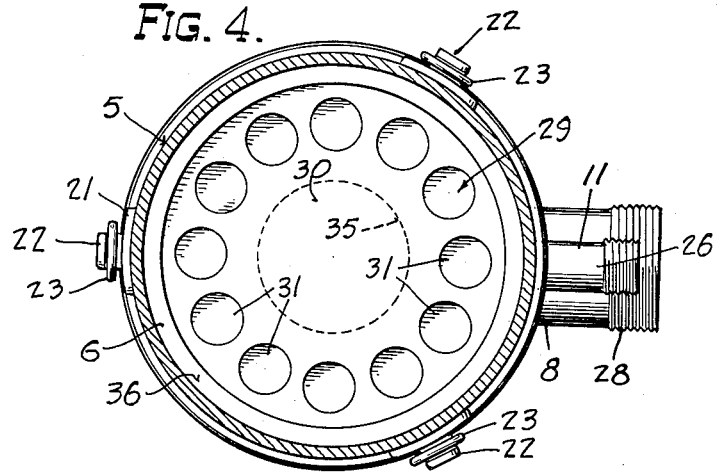
Fig. 4 is a horizontal transverse section taken on line 4—4 of Fig. 3.
Figure 5:
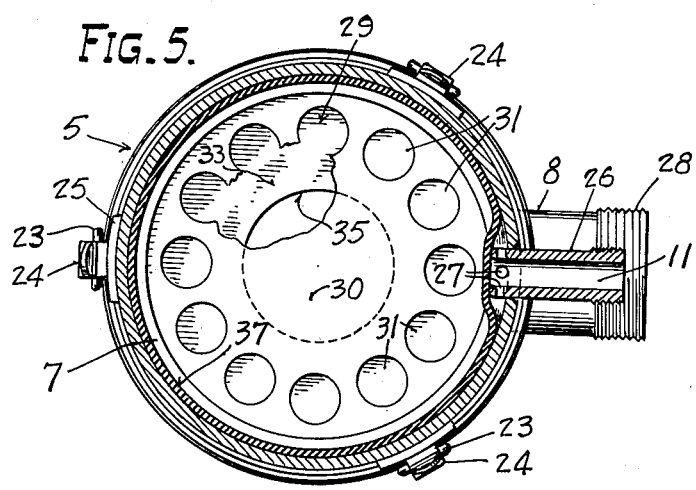
Fig. 5 is a horizontal transverse section taken on line 5—5 of Fig. 3.

The milk releaser 5, as best shown in Fig. 3, is generally cylindrical in shape and comprises an upper receiving chamber 6, an intermediate or release chamber 7, and a lower discharge tube or chamber 8. The cylindrical casing for the component parts just described may be made of any suitable metal such as for instance stainless steel. The receiving chamber 6 is closed by a top or dome which may be joined circumferentially as by welding to the top of the casing for the receiving chamber. A ferrule connection 18 is secured, generally centrally, to the dome and extends outwardly therefrom.

A threaded connection 19 extends outwardly from the side of ferrule 18 and is adapted to be connected to the vacuum side of the system.

As will be more fully explained hereinafter ferrule connection 18 serves as a support or housing for a plurality of electrodes which extend downwardly therethrough into the interior of receiving chamber 6.

A second ferrule connection 20 is secured, preferably as by welding, to the side wall of the receiving chamber and is adapted to be connected to the milk supply line 3 to carry milk into the receiving chamber. All the connections just described may be fabricated from any suitable metal such as stainless steel which is not subject to attack from milk.

The lower circumferential edge of the receiving chamber is finished round, as are the upper and lower circumferential edges of the releaser chamber 7, and the upper circumferential edge of the discharge chamber or tube 8.

A plurality of plates 21 of a curvature similar to that of the walls of the receiving chamber 6 and the discharge chamber 8 are equally spaced about and secured to the outer surface of the chamber walls and are provided with hooks 22. The hooks receive one end of a link 23 which comprises one element of a snap locking mechanism 24 which is equally spaced to conform with the hooks 22, and which are carried on plates 25, similar in plates 21, and which are secured adjacent the upper and lower edges of the releaser chamber 7. The snap-type lock mechanisms just described releasably secure the various members of the milk releaser together in vertical alignment and afford a quick release of the members for any purpose whatsoever, such as for cleaning.

Nipple 26 extends through and is secured to the side wall of the releaser chamber 7 and is provided at its inner end with a plurality of spaced apertures 27 for the purpose of carrying air to or from the vacuum or exhaust side of pump 13 to create a vacuum or a pressure in the releaser chamber as may be desired in accordance with a predetermined cycle activated in accordance with the electrically operated timer as will be later described.

Discharge chamber 8 is disposed below releaser chamber 7 and is provided at one side thereof with cylindrical shaped tube 28, preferably of stainless steel and which is secured to the discharge chamber preferably by welding. A ferrule connection is provided at the outer end of the discharge tube to connect the same to the milk supply line extending between the discharge chamber and the bulk supply receiver 9, such as a milk cooler.

Flexible diaphragm valves 29 are disposed between the receiving chamber 6 and the releaser chamber 7, and between the releaser chamber 7 and the discharge chamber 8. Each valve comprises a metal disc 30 of generally circular shape which is provided with a plurality of spaced openings 31 adjacent its edge. The circumferential edges of the openings 31 are rounded to provide smooth surfaces as is the circumferential edge of disc member 30.

A generally circular flexible diaphragm 32, preferably fabricated from rubber or other material which will not support bacteria growth nor be affected by the butter fat of the milk, is disposed flat against the bottom side of each metal plate 30. The diaphragm 32 has a body portion 33 which extends inwardly from the doubled flanged circumferential edge 34 of the diaphragm for a suitable distance thereby to leave a central aperture or opening 35 extending through the body portion 33. Disposed above the body portion 33 and circumferentially inwardly of the inner surface of the double flanged edge of the diaphragm is a horizontally disposed flange 36 which is disposed in parallel relationship to the body portion 33. Plate 30 is disposed between the members 33 and 36 of the diaphragm with a substantially tight fit so that the body portion 33 will lie closely against the plate 30 thereby covering the apertures 31 in the plate.

The valves 29, consisting of the plate 30 and the flexible diaphragm 32 are disposed between the receiving chamber 6 and the releaser chamber 7, and between the releaser chamber 7 and the discharge chamber 8 and are held firmly clamped therebetween by the locking mechanisms 24 as above described. The rim 34 of each diaphragm serves to seal the chambers when the respective casings are assembled and locked in place.

A flexible liner 37, preferably made of a material similar to that of diaphragm 32 and having flanges 38 at the top and bottom thereof and of a size and shape to fit the inside of the releaser chamber 7, is disposed within the chamber, with the flanges 38 disposed over the top and bottom edges of the releaser chamber 7. As above stated the edges of all chamber walls are rounded to remove any sharp edges so that the edges of the walls will not cut or damage any rubber or similar surfaces which contact and seal the same. The inner circumferential edge of the nipple 26 is rounded to prevent damage to the flexible liner with which the nipple contacts. As best seen in Fig. 3, the liner 37, when disposed with its flanges 38 extending over the top and bottom edges of the casing for the releaser chamber 7, will be held firmly on these edges when the locking mechanisms 24 are snapped shut.

As above described the nipple 26 may be supplied alternately with air from the vacuum or exhaust side of the pump 13 thereby causing flexing of the liner outwardly against the inner edge of the nipple and the walls of the releaser chamber 7, or forcing the liner to flex inwardly when pressure is applied thereto. At the same time the body portion 33 of the diaphragm 32 will alternately flex either away from or towards the metal plate 30 either uncovering or closing the openings 31 therein so that when the openings in the upper plate 30 disposed between the receiving chamber and the releaser chamber become uncovered due to a vacuum pulled through the nipple 26, the openings 31 in the lower plate 30, disposed between the releaser chamber and the discharge chamber, will be covered. The converse will be true of course if pressure is exerted on the bag or liner 37 from the exhaust side of the pump through nipple 26.

The milk releaser of this invention is adapted to be positively operated electrically to deliver a certain predetermined quantity of milk to the discharge chamber during a cycle of operation. As above briefly described, the ferrule connection 18 secured to the dome of the receiving chamber 6 has a plurality of electrodes 39, 40 and 41 extending downwardly into the interior of the receiving chamber 6.

Electrodes 39 and 40 are electrically connected to a relay coil 42 while electrodes 39 and 41 are connected to a relay coil 43. A timer mechanism 44, having a switch 45 in its power line, is adapted to be set in motion upon closing of the switch as will be presently explained.

Relay coil 43, when energized, will operate switch 46 which is connected into the power line for operating the vacuum pump 13. The timer mechanism is so constructed as to operate selectively, solenoid valves 47 and 48, the former being connected into the vacuum side of the pump and the latter being connected to the exhaust side of the pump. A suitable automatic pressure regulator 49 may be disposed in line 11 to control the pressure exerted within chamber 7 behind the flexible lining 37.

As an example of the manner in which the above described apparatus functions, when the level of the milk in the receiving chamber rises to a point where the milk will complete the circuit between electrodes 39 and 40, relay coil 42 will become energized thereby closing switch 45. This will start the timer 44 which energizes the solenoid valve 47 for a specified period of time, and subsequently solenoid valve 48 for a subsequent period of time. The alternate energizing of the respective solenoid valves will alternately permit a vacuum to be pulled behind the liner of the releaser chamber or to positively supply a pressure behind the flexible liner within the releaser chamber. Even though the level of the milk in the receiving chamber may rise to contact the ends of electrodes 39 and 40 before the milk is completely squeezed from chamber 7, the switch 45 will remain closed until the specific squeezing period has been completed. If for any reason the milk in the receiving chamber rises to a level where it will contact electrode 41, relay coil 43 will become energized thereby opening switch 46. This will cause a break in the electrical circuit to the vacuum pump 13 thereby stopping the pump. This of course, functions as a safety device.

The particular mechanism employed in the timer is not shown, nor is the timer per se the subject matter of this invention. However, the combination of the particular structure of the milk releaser operated as it is, by the timer, to deliver a quantity of milk from the releaser chamber to the discharge chamber under a positive pressure, does fall within the scope of the invention.

As above described, the milk releaser of this invention may be readily disassembled so that the same may be cleaned whenever desired. It is entirely feasible, if desirable to clean the releaser without disassembly of the unit, it being merely necessary to run a detergent or other cleaning medium through the releaser in the same manner that milk would pass therethrough thereby taking advantage of the positive pressure applied to the flexible liner in the releaser chamber to force the cleaning medium through the releaser chamber.

The operation of the system is as follows: The vacuum pump 13 is started and the vacuum operated teat cups 1 are placed on the cow and milk begins to flow into milk line 3.

A vacuum is also drawn in receiving chamber 6 through line 16 causing upper diaphragm valve 29, separating chambers 6 and 7, to be in the closed position. The vacuum drawn in chamber 6 may be in the range of 12 to 15 inches of mercury while the pressure in chamber 7 is about atmospheric to start, and the resulting pressure differential serves to close the upper diaphragm valve 29.

Milk under vacuum flows into chamber 6 from line 3 until the level of the milk rises to a point where it will complete the circuit across the electrodes 39 and 40 thereby actuating timer 44 and causing vacuum valve 47 to open. Opening valve 47 results in a vacuum being drawn in chamber 7 which up to this time has been free of milk, and at substantially atmospheric pressure.

Figure 6:
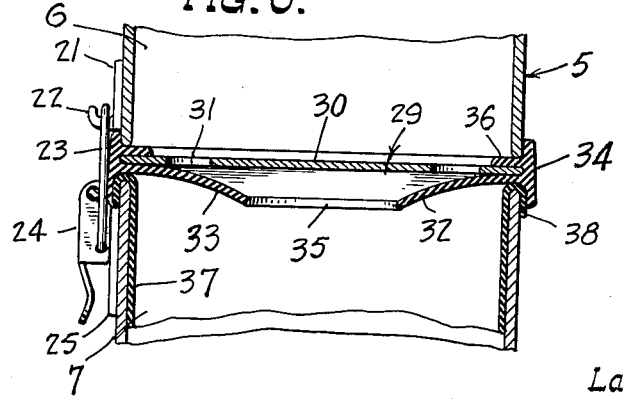
Fig. 6 is an enlarged detail section showing the actuation of one of the diaphragm valves to open position.

When the vacuum in chamber 7 nearly equals the vacuum in the receiver chamber 6, the weight of the milk in chamber 6 will open the top diaphragm valve 29, as shown in Fig. 6, thereby permitting the milk to drop into the releaser chamber 7.

It is contemplated that the vacuum finally developed in chamber 7 be of a greater magnitude than the vacuum in receiver chamber 6, so that the pressure differential between the two chambers 6 and 7 will aid in bringing the milk down into chamber 7 at a considerably faster rate than if gravity alone was used. It is preferred to develop a vacuum in the range of 17 to 20 inches of mercury in chamber 7, and as the vacuum is greater, the pressure being less, in chamber 7 than chamber 6 the milk will be forced downwardly into chamber 7 by the greater pressure in chamber 6. This results in a much faster flow of milk into the releasing chamber 7 and speeds up the entire releasing operation.

After a predetermined time interval, timer 44 closes vacuum valve 47 and opens pressure valve 48 thereby permitting pressure to be exerted behind the flexible liner 37 in chamber 7 and forcing the liner 37 inwardly. When the pressure in chamber 7 exceeds the pressure in receiving chamber 6, the upper diaphragm valve 29 will close and shut off the flow of milk between the two chambers.

The pressure in chamber 7 is increased and when it nearly equals the pressure in chamber 8, which is at approximately atmospheric pressure, the weight of the milk in chamber 7 will open the lower diaphragm valve 29, separating chambers 7 and 8, thereby permitting the milk to flow into chamber 8.

To hasten the flow of milk from chamber 7 to chamber 8 a final pressure of about 3 to 5 pounds per square inch (gauge pressure) is developed within chamber 7. The positive pressure differential between chambers 7 and 8 aids in forcing the milk downwardly through the lower valve 29 into chamber 8 and hence to the piping system. The pressure in chamber 7 forces the liner 37 inwardly and thereby tends to squeeze the milk from the chamber, and this squeezing action greatly increases the rate of flow of milk between chambers 7 and 8 over the rate of flow which would occur due to the weight of the milk alone.

While it is desirable to develop a pressure in chamber 7 exceeding the atmospheric pressure in chamber 8 in order to force the milk into chamber 8, it is preferred not to develop a pressure much over 5 pounds per square inch gauge because chamber 7 is subsequently evacuated and it would require an excessive period of time to evacuate the chamber if a pressure over 5 pounds per square inch existed therein.

On one hand, a high pressure is desirable in chamber 7 to increase the rate of flow of milk from chamber 7 to chamber 8 and on the other hand a high pressure in chamber 7 requires a greater period of evacuation to reduce the pressure therein to the desired amount of vacuum. It is therefore necessary to balance these factors to obtain optimum operating conditions. As previously stated a squeezing pressure of about 2 to 5 pounds per square inch in chamber 7 is extremely satisfactory.

After a predetermined time interval, sufficient to permit the milk within chamber 7 to be completely discharged therefrom, timer 44 closes pressure valve 48 and the pressure in chamber 7 is decreased causing lining 37 to collapse outwardly to its normal position. The pressure in chamber 7 is reduced to about atmospheric, and, as such, it is substantially greater than the pressure in chamber 6, which is continually under a vacuum. This pressure differential maintains upper valve 29, separating chambers 6 and 7, in the closed position. The apparatus is then in readiness to release a second charge of milk from chamber 6.

During the cyclic operation milk is continually entering chamber 6 and when the level of the milk again rises to a point where it completes the circuit across electrodes 39 and 40 the timer 44 is actuated and the vacuum-pressure time cycle is again started in chamber 7.

The above described invention provides a milk delivery system in which a milk releaser chamber or container embodied in the system is actuated by positive air pressure to force the milk from the chamber thereby permitting a greater quantity of milk to be delivered than in the ordinary gravity type milk releasers. The air forced into the releaser chamber for accomplishing the above is prevented from coming into contact with the milk thereby affording protection against contamination while at the same time the vacuum and pressure connection is protected against the entrance of milk or froth which might tend to foul the same. The system is automatic and provides a safety device to cut off the vacuum system in the event that the level of milk rises beyond a specified point in the receiving chamber.

The milk is discharged or squeezed from chamber 7 under a positive pressure and this factor permits the milk to be raised to certain practical heights in the subsequent piping system, if necessary, without the need of a pump. The air pressure acting behind liner 37 in chamber 7 forces or squeezes the milk therefrom and in itself acts as a pump which supplies the milk with sufficient pressure to convey the same to the cooler.

As shown in the drawings, one vacuum pump 13 is employed to develop the milk line and pulsator vacuum as well as the vacuum in releasing chamber 7. It may be desirable, depending on the particular operation, to have a smaller vacuum pump for each operation rather than one for the group.

Various embodiments of the invention may be employed within the scope of the following claims.

I claim:

1. A milk releaser for milking machine operation, comprising a tank composed of at least three generally cylindrical sections, the central section having a flexible tubular lining with end flanges extending over the end edges thereof, valve means disposed between the tank sections and separating the tank into chambers corresponding to said sections, said valve means at each end of said lined section comprising a disc having an opening therethrough and a flexible diaphragm normally disposed against the bottom of said disc and closing said opening, the diaphragm having an opening therein normally closed by said disc and having a rim adapted to confine the edge of the disc and seal between the adjacent tank sections, means to deliver milk under a vacuum to the chamber immediately above said central section, means connecting the chamber immediately below said central section to a bulk receiver for the milk, means connected to said central section to provide alternate periods of pressure and vacuum behind the liner of said central section to actuate said valves alternately, means responsive to the level of the milk in the vacuum receiving chamber immediately above said central section to control the operation of said alternate pressure and vacuum means, and mechanical means locking said tank sections and valves in assembled relation and being adapted to release the same for separate cleaning.

2. A milk releaser for milking machine operation, comprising a tank having three superimposed chambers separated in series by pressure actuated dumping valves, a flexible wall in the intermediate chamber dividing the same into an air receiving chamber and a milk receiving chamber, means to deliver milk under a vacuum to the upper chamber, means to discharge milk from the lower chamber to a bulk receiver, means connected to said air chamber to provide alternate periods of pressure and vacuum to said air chamber to flex the wall thereof and effect operation of said dumping valves, said valves being disposed to dump milk from the upper chamber to the intermediate chamber when vacuum is applied to said air chamber and to discharge milk from said intermediate chamber through said lower chamber to said bulk receiver when pressure is applied to said air chamber, and means responsive to the level of the milk in said upper chamber for controlling the actuation of said last named means.

3. A milk releaser for milking machine operation, comprising a tank having three chambers separated in series by pressure actuated dumping valves, a flexible wall in the intermediate chamber dividing the same into an air receiving chamber and a milk receiving chamber, means to deliver milk under a vacuum from a cow to the first chamber, means to discharge milk from the last chamber to a bulk receiver, means connected to said air chamber to provide alternate periods of pressure and vacuum to said air chamber to flex the wall thereof and effect operation of said dumping valves, said valves being disposed to dump milk from the first chamber to the intermediate chamber when vacuum is applied to said air chamber and to discharge milk from said intermediate chamber through said last chamber to said bulk receiver when pressure is applied to said air chamber, means responsive to the level of the milk in said first chamber for controlling the actuation of said last named means, and safety means operably associated with the first chamber and responsive to an abnormally high level of milk in said first chamber for terminating the milking operation.

4. In a milk delivery system, a tank adapted to receive milk from a supply line and deliver the same to a bulk storage comprising a plurality of vertically superimposed and aligned individual containers, flexible dumping valves disposed between each successive pair of containers and each comprising a diaphragm adapted to selectively open and close a passage between the containers to pass milk from or restrain the passage thereof from one said container to the next, a first of said containers being connected to the supply line under a vacuum to draw milk into the container and to hold the immediately adjacent lower valve closed, a flexible liner longitudinally disposed in the second container immediately beneath said first container and held therein by releasable locks for securing the containers together, a source of vacuum, a source of pressure, and means connected to the second container and alternately connected to the source of vacuum and the source of pressure to supply pressure to the outer surface of the flexible liner and to pull a vacuum between the liner and the container to flex the liner and simultaneously flex said dumping valves to open or closed position and thereby force milk from the second container into the next subjacent container or draw milk into the second container from the first container respectively.

5. A milk delivery system, comprising a tank having an upper chamber, an intermediate chamber and a lower chamber, a valve disposed between the upper and intermediate chambers and a valve disposed between the intermediate and lower chambers, vacuum means to provide a vacuum within said intermediate chamber, second vacuum means to provide a vacuum within said upper chamber, pressure means to provide a positive pressure within said intermediate chamber, a plurality of electric circuits, timing means operable by a first of said circuits to alternately actuate said first vacuum means and said pressure means and operable with a second of said circuits to shut off said first and second vacuum means, and a circuit closer within the upper chamber and comprising spaced terminals disposed to be connected together through the milk when a predetermined level of milk has been reached to close said first circuit and actuate said timing means to alternately apply pressure and vacuum to said intermediate chamber and said circuit closer having second spaced terminals disposed to be connected together through the milk when a second predetermined level of milk has been reached to close said second circuit to shut off operation of said first and second vacuum means, said first named valve being disposed to open when vacuum is applied to said intermediate chamber and to close when pressure is applied to the intermediate chamber, and said second named valve being disposed to open when pressure is applied to said intermediate chamber and to close when vacuum is applied thereto.

6. A milk delivery system, comprising a tank having a receiving chamber, a releasing chamber and a discharge chamber, a valve disposed between the receiving and releasing chambers and a second valve disposed between the releasing and discharge chambers, vacuum means to provide a vacuum within said releasing chamber, pressure means to provide a positive pressure within said releasing chamber, an electric circuit, means operable by said electric circuit to alternately actuate said vacuum means and said pressure means, and a circuit closer disposed within the receiving chamber and comprising spaced terminals disposed to be connected together through the milk when a predetermined level of milk has been reached to close said circuit and actuate said last-named means to alternately apply pressure and vacuum to said releasing chamber, said first named valve being disposed to open when vacuum is applied to said releasing chamber and to close when pressure is applied thereto.

References Cited in the file of this patent

UNITED STATES PATENTS

| | | |
|---|---|---|
| 1,559,315 | Daysh | Oct. 27, 1925 |
| 1,644,435 | Knapp | Oct. 4, 1927 |
| 1,820,981 | Le Fever | Sept. 1, 1931 |
| 1,962,192 | Hapgood | June 12, 1934 |
| 1,995,611 | Hapgood | Mar. 26, 1935 |
| 2,015,127 | Rieger | Sept. 24, 1935 |
| 2,046,491 | Scott | July 7, 1936 |
| 2,291,912 | Meyers | Aug. 4, 1942 |
| 2,313,551 | Hurlbut | Mar. 9, 1943 |
| 2,419,993 | Green et al. | May 6, 1947 |
| 2,583,723 | Berry | Jan. 29, 1952 |
| 2,621,608 | McIntyre | Dec. 16, 1952 |
| 2,625,133 | Hein | Jan. 13, 1953 |
| 2,664,829 | Horton et al. | Jan. 5, 1954 |